US008296202B2

(12) United States Patent
Matsuda et al.

(10) Patent No.: US 8,296,202 B2
(45) Date of Patent: Oct. 23, 2012

(54) TASK MANAGEMENT SYSTEM

(75) Inventors: Hideki Matsuda, Fujimi (JP); Junji Ajioka, New York, NY (US); Minori Yoshimura, Matsumoto (JP)

(73) Assignee: Seiko Epson Corporation (JP)

( * ) Notice: Subject to any disclaimer, the term of this patent is extended or adjusted under 35 U.S.C. 154(b) by 395 days.

(21) Appl. No.: 12/325,454

(22) Filed: Dec. 1, 2008

(65) Prior Publication Data

US 2009/0144182 A1     Jun. 4, 2009

(30) Foreign Application Priority Data

Nov. 30, 2007   (JP) .................................. 2007-310000

(51) Int. Cl.
*G06F 15/02* (2006.01)
(52) U.S. Cl. ................ 705/32; 705/20; 705/24; 705/30; 705/408
(58) Field of Classification Search .................... None
See application file for complete search history.

(56) References Cited

U.S. PATENT DOCUMENTS

| | | | | |
|---|---|---|---|---|
| 5,875,431 | A * | 2/1999 | Heckman et al. ................... 705/7 |
| 6,073,108 | A * | 6/2000 | Peterson ............................ 705/8 |
| 6,167,378 | A * | 12/2000 | Webber, Jr. ........................ 705/8 |
| 6,356,928 | B1 * | 3/2002 | Rochkind ...................... 718/101 |
| 6,415,259 | B1 * | 7/2002 | Wolfinger et al. ................ 705/8 |
| 7,076,184 | B2 * | 7/2006 | Zwiefelhofer ................... 399/79 |
| 7,562,029 | B2 * | 7/2009 | Majd et al. ........................ 705/8 |
| 7,821,660 | B2 * | 10/2010 | Kitada .......................... 358/1.15 |
| 8,121,874 | B1 * | 2/2012 | Guheen et al. ................ 705/7.11 |
| 2002/0069167 | A1 * | 6/2002 | Conlow .......................... 705/40 |
| 2003/0225587 | A1 * | 12/2003 | Mueller ............................ 705/1 |
| 2004/0153385 | A1 * | 8/2004 | Allibhoy et al. ................. 705/35 |
| 2005/0033465 | A1 * | 2/2005 | Arima et al. ................... 700/108 |
| 2005/0060348 | A1 * | 3/2005 | Coyne et al. ............... 707/104.1 |

(Continued)

FOREIGN PATENT DOCUMENTS

| | | |
|---|---|---|
| JP | 2001-306773 | 11/2001 |
| JP | 2002-215800 | 8/2002 |
| JP | 2003-187040 | * 4/2003 |
| JP | 2003-187040 | 7/2003 |

(Continued)

*Primary Examiner* — Ryan Zeender
*Assistant Examiner* — Fateh Obaid
(74) *Attorney, Agent, or Firm* — Harness, Dickey & Pierce, P.L.C.

(57) ABSTRACT

A task management system includes: an attribute information acquiring unit acquiring attribute information indicating an attribute of a document corresponding to document data; a billing destination information generator extracting attribute information specifying a billing destination of a cost caused as a price of performance of a task using the document data from the attribute information acquired by the attribute information acquiring unit and generating billing destination information indicating the billing destination on the basis of the extracted attribute information; a process content information storage storing process content information indicating a content of a process performed on the document data by a task terminal used by a task performer; a task content specifier specifying the content of the task performed on the document data by the task performer on the basis of the process content information stored in the process content information storage; a cost correlation storage storing a correlation of the content of the task and the cost caused as the price of the performance of the task; a billing amount information generator generating billing amount information indicating a billing amount for the billing destination on the basis of the content of the task specified by the task content specifier and the correlation stored in the cost correlation storage; and a billing information storage correlating and storing the billing destination information generated by the billing destination information generator and the billing amount information generated by the billing amount information generator.

14 Claims, 12 Drawing Sheets

U.S. PATENT DOCUMENTS

| | | | |
|---|---|---|---|
| 2006/0071981 A1* | 4/2006 | Plunkett | 347/59 |
| 2007/0250784 A1* | 10/2007 | Riley et al. | 715/764 |
| 2008/0201238 A1* | 8/2008 | Sulmar et al. | 705/26 |
| 2009/0006184 A1* | 1/2009 | Leach et al. | 705/10 |
| 2010/0192207 A1* | 7/2010 | Raleigh | 726/6 |

FOREIGN PATENT DOCUMENTS

| | | |
|---|---|---|
| JP | 2006-277647 | 10/2006 |
| JP | 2003-277647 | * 12/2006 |
| JP | 2006-344178 | * 12/2006 |

* cited by examiner

| ATTRIBUTE INFORMATION (DOCUMENT A) ||
|---|---|
| BILLING DESTINATION ID | ○△COMPANY |
| TASK ID | SEARCH REPORT |
| DOCUMENT ID | AAA.doc |

FIG. 3

| DOCUMENT ID | PROCESS CONTENT ID | PROCESS START TIME | PROCESS END TIME |
|---|---|---|---|
| AAA.doc | READ | 10:00:27 | 10:00:27 |
| AAA.doc | DISPLAY | 10:00:28 | 13:42:50 |
| AAA.doc | WRITE | 10:00:57 | 10:00:57 |
| AAA.doc | WRITE | 10:01:00 | 10:01:00 |
| ... | ... | ... | ... |
| AAA.doc | WRITE | 13:38:43 | 13:38:43 |
| AAA.doc | STORE | 13:38:57 | 13:38:57 |
| AAA.doc | PRINT | 13:41:03 | 13:41:14 |
| ... | ... | ... | ... |
| ... | ... | ... | ... |

| DOCUMENT ID | TASK TYPE ID | TASK TIME ZONE | TASK ENGAGEMENT PERIOD |
|---|---|---|---|
| AAA.doc | PREPARATION OF DOCUMENT | DAYTIME | 5:00 |
| | RESEARCH | LATE NIGH | 0:23 |
| | ... | ... | ... |

| PROCESS CONTENT ID | TASK TYPE ID | 1053 |
|---|---|---|
| READ ↓ DISPLAY ↓ WRITE ↓ STORE | PREPARATION OF DOCUMENT | |
| DISPLAY ↓ WRITE | RESEARCH | |
| ... | ... | |

| BILLING DESTINATION ID | DOCUMENT ID | TASK TYPE ID | TASK TIME ZONE | TASK ENGAGEMENT PERIOD | BILLING AMOUNT |
|---|---|---|---|---|---|
| OFFICE ABC | BBB.doc | PREPARATION OF DOCUMENT | DAYTIME | 7:23 | ¥135,000 |
| XX COMPANY | | RESEARCH | DAYTIME | 1:02 | ¥42,300 |
| ︙ | ︙ | ︙ | ︙ | ︙ | ︙ |
| ︙ | ︙ | ︙ | ︙ | ︙ | ︙ |

| DOCUMENT ID | PROCESS CONTENT ID | PROCESS START TIME | PROCESS END TIME |
|---|---|---|---|
| AAA.doc | READ | 10:00:27 | 10:00:27 |
| AAA.doc | DISPLAY | 10:00:28 | |
| | | | |

| DOCUMENT ID | PROCESS CONTENT ID | PROCESS START TIME | PROCESS END TIME |
|---|---|---|---|
| AAA.doc | READ | 10:00:27 | 10:00:27 |
| AAA.doc | DISPLAY | 10:00:28 | |
| AAA.doc | WRITE | 10:00:57 | 10:00:57 |
| | | | |

| DOCUMENT ID | TASK TYPE ID | TASK TIME ZONE | TASK ENGAGE-MENT PERIOD |
|---|---|---|---|
| AAA.doc | PREPARATION OF DOCUMENT | DAYTIME | 3:42 |
| | | | |
| | | | |

| BILLING DESTINATION ID | DOCUMENT ID | TASK TYPE ID | TASK TIME ZONE | TASK ENGAGEMENT PERIOD | BILLING AMOUNT |
|---|---|---|---|---|---|
| O△COMPANY | AAA.doc | PREPARATION OF DOCUMENT | DAYTIME | 7:23 | |

| BILLING DESTINATION ID | DOCUMENT ID | TASK TYPE ID | TASK TIME ZONE | TASK ENGAGEMENT PERIOD | BILLING AMOUNT |
|---|---|---|---|---|---|
| O△COMPANY | AAA.doc | PREPARATION OF DOCUMENT | DAYTIME | 7:23 | ¥125,000 |

TASK MANAGEMENT SYSTEM

BACKGROUND

1. Technical Field

The present invention relates to a technique of managing contents of a task performer's task and making a charge for the performance of the task.

2. Related Art

In occupations often using information processing terminals to perform tasks such as preparing a document in response to a client's request or extracting examples or information from a database, contents of a task performed by a task performer need to be managed in detail to determine a billing amount charged to a client as a prices of the performance of the task. For example, the time required for a task and the cost required for performing the task are calculated and the final billing amount is calculated on the basis of the calculation result. In addition, a client may require the disclosure of details of the cost. Accordingly, the task management is very important. Therefore, JP-A-2003-187040 discloses that task contents of employees, client information, task engagement time, and cost are managed in a system. JP-A-2006-344178 discloses that a computer collects task information and automatically transmits the collected task information to a main server. JP-A-2001-306773 discloses that data on attendance or job gain input by a client is managed and collected by the use of a server.

However, in the techniques described in JP-A-2003-187040, JP-A-2006-344178, and JP-A-2001-306773, since a task performer or a system manager need manually input the contents or reports of the tasks in detail, it gives a great burden on the task performer, etc. It is difficult for the task performer to perform the input operation frequently but performs the input operation every predetermined period (for example, 1 to several days). Accordingly, a time lag occurs between the actual performance of a task and the input operation and thus the task performer may erroneously perform the input operation.

SUMMARY

An advantage of some aspects of the invention is to accurately manage task contents and to claim the price thereof without giving a great burden to a task performer.

According to a first aspect of the invention, there is provided a task management system including: an attribute information acquiring unit acquiring attribute information indicating an attribute of a document corresponding to document data; a billing destination information generator extracting attribute information specifying a billing destination of a cost caused as a price of performance of a task using the document data from the attribute information acquired by the attribute information acquiring unit and generating billing destination information indicating the billing destination; a process content information storage acquiring and storing process content information indicating a content of a process performed on the document data by a task terminal used by a task performer; a task content specifier specifying the content of the task performed on the document data by the task performer on the basis of the process content information stored in the process content information storage; a cost correlation storage storing a correlation of the content of the task and the cost caused as the price of the performance of the task; a billing amount information generator generating billing amount information indicating a billing amount for the billing destination on the basis of the content of the task specified by the task content specifier and the correlation stored in the cost correlation storage; and a billing information storage correlating and storing the billing destination information generated by the billing destination information generator and the billing amount information generated by the billing amount information generator.

According to this configuration, it is possible to accurately manage task contents and to claim the price thereof without giving a great burden to a task performer.

According to a second aspect of the invention, there is provided a task management system including: a process content information storage storing process content information indicating a content of a process performed on document data by a task terminal used by a task performer; a storage storing a correlation of the process content information and billing destination information indicating a billing destination of a cost caused as a price of performance of the task on the document data; a task content specifier specifying a content of the task performed on the document data by the task performer on the basis of the process content information stored in the process content information storage; a cost correlation storage storing a correlation of the content of the task and the cost caused as the price of the performance of the task; a billing amount information generator generating billing amount information indicating a billing amount for the billing destination on the basis of the content of the task specified by the task content specifier and the correlation stored in the cost correlation storage; and a billing information storage correlating and storing the billing destination information generated by the billing destination information generator and the billing amount information generated by the billing amount information generator.

According to this configuration, it is possible to accurately manage task contents and to claim the price thereof without giving a great burden to a task performer.

In the task management system according to any of the aspects of the invention, the billing information storage may correlate and store the content of the task specified by the task content specifier with the billing destination information and the billing amount information.

According to this configuration, it is possible to correlate and store the content of the task with the billing destination information and the billing amount information.

The task management system may further include an output unit outputting the data stored in the billing information storage by the use of one of a print output, a display output, and a transmission output.

According to this configuration, it is possible to output the billing destination information and the billing amount information in various forms.

In the task management system according to the first aspect, the cost correlation storage may correlate and store the attribute information with the cost, and the billing amount information generator may generate the billing amount information on the basis of the attribute information acquired by the attribute information acquiring unit and the correlation of the cost and the attribute information stored in the cost correlation storage.

According to this configuration, it is possible to generate the billing amount information on the basis of the attribute information.

In the task management system according to the first aspect, the billing destination information generator may include a storage storing the correlation of the content of the task and the billing destination information and may generate the billing destination information on the basis of the content of the task specified by the task content specifier and the correlation stored in the storage.

According to this configuration, it is possible to generate the billing destination information on the basis of the content of the task.

In the task management system according to the first aspect, the attribute information for specifying the billing destination may include at least one of billing destination identification information assigned to the billing destination, task identification information assigned to the task, and document identification information assigned to the document data.

According to this configuration, it is possible to generate the billing destination information on the basis of the attribute information.

In the task management system according to any of the aspects of the invention, the content of the task specified by the task content specifier may include at least one of a title or type of the task and a task time zone or task engagement period when a task performer performs the task.

According to this configuration, it is possible to generate the billing amount information on the basis of the content of the task.

In the task management system of any of the aspects of the invention, the process content information stored in the process content information storage may be information on at least one of a process of reading document data, a process of displaying a document based on the document data, a process of searching for the document data, a process of writing data to the document data, a process of transmitting the document data to an external device, a process of storing the document data in the storage, and a process of printing the document data in the task terminal.

According to this configuration, it is possible to generate the billing amount information on the basis of the content of the task.

In the task management system of any of the aspects of the invention, the process content information on the process of printing the document data may include device identification information assigned to a printer having performed the printing operation or device type information indicating the type of the printer. The task management system may further include: a storage storing the device identification information or the device type information assigned to a specific printer; and an identification information storage correlating and storing identification information indicating that the specific printer performs the printing operation with the billing amount information generated by the billing amount information generator, when the device identification information or the device type information included in the process content information is the device identification information or the device type information stored in the storage.

According to this configuration, it is possible to claim the cost required for performing the printing operation of the specific printer in performing the task.

The task management system may further include: an authentication information storage correlating and storing identification information assigned to a task performer and authentication information for authenticating the task performer; an authentication information acquiring unit acquiring authentication information of a task performer from the task terminal; and an authentication unit checking the authentication information acquired by the authentication information acquiring unit with the authentication information stored in the authentication information storage and specifying identification information correlated and stored in the authentication information storage with the corresponding authentication information. Here, the billing information storage may correlate and store the billing destination information and the billing amount information with the identification information specified by the authentication unit.

According to this configuration, it is possible to correlate and store the identification information for specifying a task performer, the billing destination information, and the billing amount information.

According to another aspect of the invention, there is provided a task management system having an image display device and a printer. Here, the image display device includes: a processor displaying a document corresponding to document data and performing a process instructed by a task performer on the document; an attribute information acquiring unit acquiring attribute information indicating an attribute of a document corresponding to document data; a billing destination information generator extracting attribute information specifying a billing destination of a cost caused as a price of performance of a task using the document data from the attribute information acquired by the attribute information acquiring unit and generating billing destination information indicating the billing destination of the cost based on the extracted attribute information; a process content information storage generating and storing process content information indicating a content of a process performed on the document data by the processor; a task content specifier specifying a content of the task performed on the document data on the basis of the process content information stored in the process content information storage; an identification information storage storing identification information assigned to a printer allowed to print out the data transmitted from the image display device; and a transmitter transmitting the billing destination information and the content of the task specified by the task content specifier to the printer to which the identification information stored in the identification information storage is assigned. The printer includes: a receiver receiving the billing destination information transmitted from the transmitter of the image display device and the content of the task; a cost correlation storage storing a correlation of the content of the task and the cost caused as a price of the performance of the task; a billing amount information generator generating billing amount information indicating a billing amount for the billing destination specified by the billing destination information received by the receiver on the basis of the content of the task received by the receiver and the correlation stored in the cost correlation storage; a billing information storage correlating and storing the billing destination information received by the receiver and the billing amount information generated by the billing amount information generator; and a printing unit printing the billing destination information and the billing amount information stored in the billing information storage on a printing medium.

According to this configuration, it is possible to accurately manage task contents without giving a great burden to a task performer and to print out the billing destination information and the billing amount information by the use of a predetermined printer.

According to still another aspect of the invention, there is provided a program allowing a computer to serves as: an attribute information acquiring unit acquiring attribute information indicating an attribute of a document corresponding to document data; a billing destination information generator extracting attribute information specifying a billing destination of a cost caused as a price of performance of a task using the document data from the attribute information acquired by the attribute information acquiring unit and generating billing destination information indicating the billing destination on the basis of the extracted attribute information; a process content information storage storing process content information indicating a content of a process performed on the document data by a task terminal used by a task performer; a task content specifier specifying the content of the task performed on the document data by the task performer on the basis of the process content information stored in the process content information storage; a cost correlation storage storing a correlation of the content of the task and the cost caused as the price of the performance of the task; a billing amount information generator generating billing amount information indicating a billing amount for the billing destination on the basis of the content of the task specified by the task content specifier and the correlation stored in the cost correlation storage; and a billing information storage correlating and storing the billing destination information generated by the billing destination information generator and the billing amount information generated by the billing amount information generator.

According to this configuration, it is possible to accurately manage task contents and to claim the price thereof without giving a great burden to a task performer.

According to still another aspect of the invention, there is provided a program allowing a computer to serves as: a process content information storage storing process content information indicating a content of a process performed on document data by a task terminal used by a task performer; a storage storing a correlation of the process content information and billing destination information indicating a billing destination of a cost caused as a price of performance of the task on the document data; a billing destination information generator extracting process content information specifying the billing destination information of a cost from the process content information stored in the process content information storage and generating the billing destination information based on the extracted process content information and the correlation stored in the storage; a task content specifier specifying a content of the task performed on the document data by the task performer on the basis of the process content information stored in the process content information storage; a cost correlation storage storing a correlation of the content of the task and the cost caused as the price of the performance of the task; a billing amount information generator generating billing amount information indicating a billing amount for the billing destination on the basis of the content of the task specified by the task content specifier and the correlation stored in the cost correlation storage; and a billing information storage correlating and storing the billing destination information generated by the billing destination information generator and the billing amount information generated by the billing amount information generator.

According to this configuration, it is possible to accurately manage task contents and to claim the price thereof without giving a great burden to a task performer.

BRIEF DESCRIPTION OF THE DRAWINGS

The invention will be described with reference to the accompanying drawings, wherein like numbers reference like elements.

FIG. 3 is a diagram illustrating a data structure of attribute information added to document data on document A.

FIG. 4 is a diagram illustrating an example of a process content management table.

FIG. 5 is a diagram illustrating an example of a task content management table.

FIG. 9 is a diagram illustrating an example of a billing information management table.

FIGS. 11A and 11B are diagrams illustrating another example of the process content management table.

FIG. 12 is a diagram illustrating another example of the task content management table.

FIGS. 15A and 15B are diagrams illustrating another example of the billing information management table.

DESCRIPTION OF EXEMPLARY EMBODIMENTS

Hereinafter, exemplary embodiments of the invention will be described in detail. In the exemplary embodiments described below, it is assumed that a task management system according to the embodiments is applied to a company having plural employees that perform tasks.

A First Embodiment

A-1 Configuration

Figure 1:
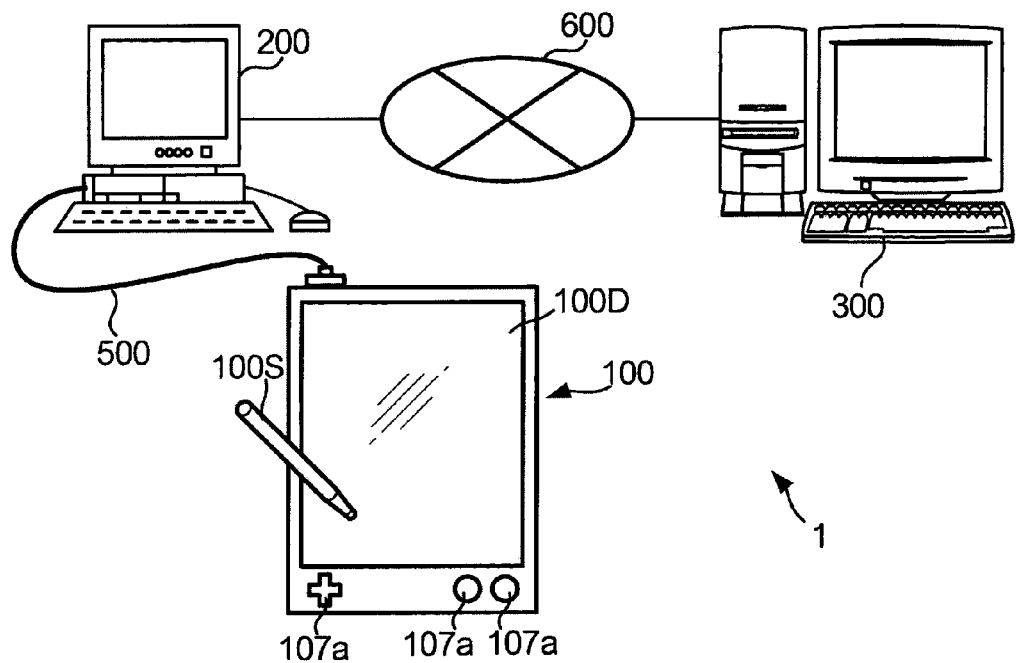
FIG. 1 is a diagram schematically illustrating a configuration of a task management system according to a first embodiment of the invention.

FIG. 1 is a diagram schematically illustrating a configuration of a task management system 1 according to a first embodiment of the invention. As shown in the drawing, the task management system 1 includes an image display device 100, a client device 200, and a server 300. The image display device 100 is a portable display device called electronic paper and the like and is assigned to the respective employees one by one. The image display device 100 is a task terminal used for the employees to perform a task using an electronic document. The client device 200 is, for example, a personal computer and is assigned to the respective employees one by one. The server 300 is a computer device storing plural document data used for the employee to perform a task or generally managing the tasks in this system. The server 300 is managed by a manager having management rights for the system. The image display device 100, the client device 200, and the server 300 are communicably connected to each other through a communication cable 500 such as a USB (Universal Serial Bus) cable or a LAN (Local Area Network) 600 and thus can transmit and receive data each other.

As shown in FIG. 1, a display unit 100D and plural operation keys 107a are disposed on the front surface of the image display device 100. The display unit 100D includes a memory display member displaying an image thereon and a touch screen disposed on the surface thereof. The operation keys 107a are operators used for an employee to designate document data displayed on the display unit 100D or to perform various tasks using the document data. A pen-like stylus pen 100S is used by a user along with the image display device 100. The stylus pen 100S is an operator used to write characters to the image displayed on the display unit 100D. The stylus pen 100S is used for an employee to perform various tasks using the document data.

A-2 Configuration of Image Display Device 100

A configuration of the image display device 100 will be described now.

Figure 2:
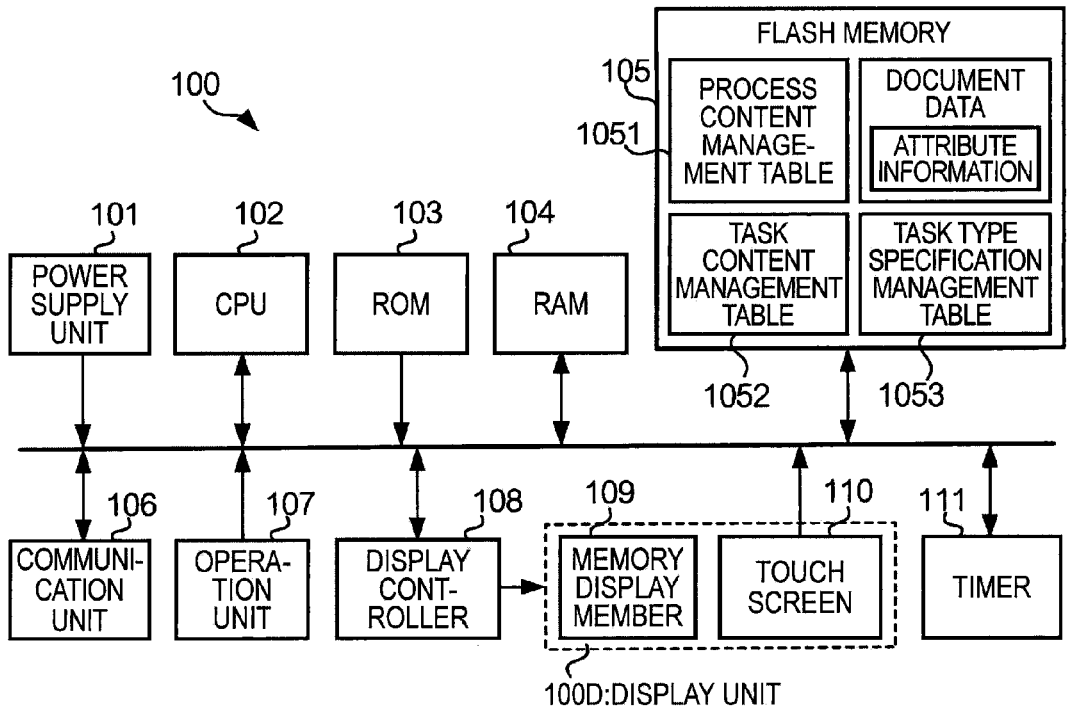
FIG. 2 is a block diagram illustrating a configuration of an image display device.

FIG. 2 is a block diagram illustrating a configuration of the image display device 100.

As shown in the drawing, the image display device 100 includes a power supply unit 101, a CPU 102, a ROM 103, a RAM 104, a flash memory 105, a communication unit 106, an operation unit 107, a display controller 108, a memory display member 109, a touch screen 110, and a timer 111. The power supply unit 101 includes a battery and a power control circuit and supplies power necessary for operation of the image display device 100. The battery of the power supply unit 101 is a rechargeable secondary battery such as a Ni—Cd battery or a Li ion battery.

The CPU 102 serves to execute programs stored in the ROM 103 or the flash memory 105 and controls to display a document on the memory display member 109 on the basis of document data or to store characters or figures input to the document data in the flash memory 105. The RAM 104 serves as a work area of the CPU 102 when the CPU 102 executes the programs. The flash memory 105 is a rewritable memory medium and stores the programs executed by the CPU 102 or the document data used for an employee to perform a task. The flash memory 105 stores three kinds of tables: a process content management table 1051, a task content management table 1052, and a task type specification management table 1053. The communication unit 106 is an interface for communication using a communication cable. The CPU 102 receives various data such as document data transmitted from the client device 200 or transmits a variety of information to the client device 200 through the communication cable inserted into the communication unit 106. The operation unit 107 includes the plural operation keys 107a and outputs operation signals responsive to the operation keys to the CPU 102.

The display controller 108 is a driving circuit driving the memory display member 109. The display controller 108 supplies driving signals corresponding to the image to be displayed to the memory display member 109 on the basis of image information stored in the flash memory 105 and controls ON/OFF of power supplied to the memory display member 109. The memory display member 109 is a display member including a liquid crystal layer having memory liquid crystal. The memory liquid crystal is liquid crystal that can hold a display state (that is, gray scale) without any application of voltage and an example thereof is cholesteric liquid crystal. The touch screen 110 is a transparent screen disposed on the front surface of the memory display member 109 as viewed from the user and senses a contact with an object every predetermined minute area. The minute area can correspond to a predetermined number of pixels (for example, 1×1 pixel or 3×3 pixels) of the memory display member 109. The touch screen 110 outputs a sensing signal indicating that an object contacts there with every minute area and supplies the sensing signal to the CPU 102. As described above, the touch screen 110 and the memory display member 109 constitute the display unit 100D. The timer 111 is a real-time clock operating in synchronization with a clock supplied from a clock generator not shown and supplies time information indicating counted time to the CPU 102.

Contents stored in the flash memory 105 will be described now.

A-2-1 Data Structure of Attribute Information

"Attribute information" indicating attributes of a document represented by document data is added to the document data stored in the flash memory 105, where the attribute information is buried in the header thereof.

FIG. 3 is a diagram illustrating a data structure of the attribute information added to the document data representing document A. As shown in the drawing, the attribute information includes "billing destination ID" as information for specifying a billing destination of the cost generated as a price of the performance of a task, "task ID", and "document ID". The "billing destination ID" is identification information assigned to the respective billing destinations as clients such as company clients. Accordingly, since the billing destination can be specified by the billing destination ID, the billing destination ID is billing destination information indicating the billing destination. As shown in the drawing, the billing destination ID of document A is "OΔ company." The "taskID" is identification information assigned to the respective tasks. In document A, the task ID is "search report" which is a task of preparing a report of a search. The "document ID" is identification information assigned to the respective document data on which tasks are performed. A file path of document data is used as the document ID and is, for example, "AAA.doc" in document A.

A-2-2 Configuration of Process Content Management Table 1051

FIG. 4 is a diagram illustrating an example of the process content management table 1051. Contents of processes performed on the document data by the image display device 100 are written to the process content management table 1051 and an example of the contents of a task is shown in the drawing, where the task is to prepare a document.

As shown in the drawing, in the process content management table 1051, a "document ID", a "process content ID", a "process start time", and a "process end time" are correlated with each other. The "document ID" is equivalent to the "document ID" included in the above-mentioned attribute information and indicates the document ID of the document data to be subjected to the processes. The "process content ID" is identification information assigned to the process contents performed on the document data by the image display device 100 and process content information indicating a process content. Here, the process contents to which the process content ID is assigned include a process of reading document data (of which the process content ID is "read." The same is applied to the following process contents), a process of displaying a document based on the document data on the display unit 100D (display), a process of searching document data (search), a process of writing data to document data (write), a process of transmitting document data to an external device (transmit), a process of storing document data in the flash memory 105 (store), and a print process of printing out contents of document data (print). The "process start time" indicates the time when the image display device 100 starts performing a process and the "process end time" indicates the time when the process is ended.

For example, the first row in the drawing represents that document data to which the document ID "AAA.doc" is assigned is read, the process start time is "10:00:27" (10:00:27 AM), and the process end time is "10:00:27." The second row in the drawing represents that a document having the document ID "AAA.doc" is displayed on the display unit 100D, the process start time is "10:00:28", and the process end time (that is, the time when the display of the document on the display unit 100D is ended) is "13:42:50."

Since the processes of "read", "write", 'store", "transmit", and "print" require very short time, the process start time and the process end time are substantially equal to each other. On the other hand, since the processes of "display" and "search" require much time from the start to the end depending on the tasks, a relatively long time exists between the process start time and the process end time.

A-2-3 Configuration of Task Content Management Table 1052

FIG. 5 is a diagram illustrating an example of the task content management table 1052. Information on contents of the task performed by an employee is written to the task content management table 1052. Specifically, as shown in the drawing, a "document ID", a "task type ID", a "task time zone", and a "task engagement period" are correlated with each other in the task content management table 1052. The "document ID" is equivalent to the "document ID" included in the above-mentioned attribute information. The "task type ID" is identification information assigned to the respective task types performed by the employees. "Preparation of document" and "research" are exemplified as the task type ID. The task type ID "preparation of document" is to write data such as characters to document data and corresponds to a task of preparing a document. The "research" corresponds to a task of extracting a specific file (information) from an information group stored in a database (of an external server, etc.). The "task time zone" indicates a time zone when an employee performs the task and one of "day", "late night", and "early morning" is assigned thereto. The unit cost varies depending on the task time zone. The "task engagement period" indicates a period of time (a period of time from the task start time to the task end time) when an employee actually performs the task.

For example, the first row in the drawing represents that the task of preparing a document is performed on the document data to which the document ID "AAA.doc" is assigned by an employee for "5:00" (5 hours) in the task time zone "day." The second row represents that the task of research is performed by an employee for "0:23" in the task time zone "late night." In the second row, since the document data in the flash memory 105 is not used, the field of document ID is blank.

A-2-4 Configuration of Task Type Specification Management Table 1053

Figures 6, 7:
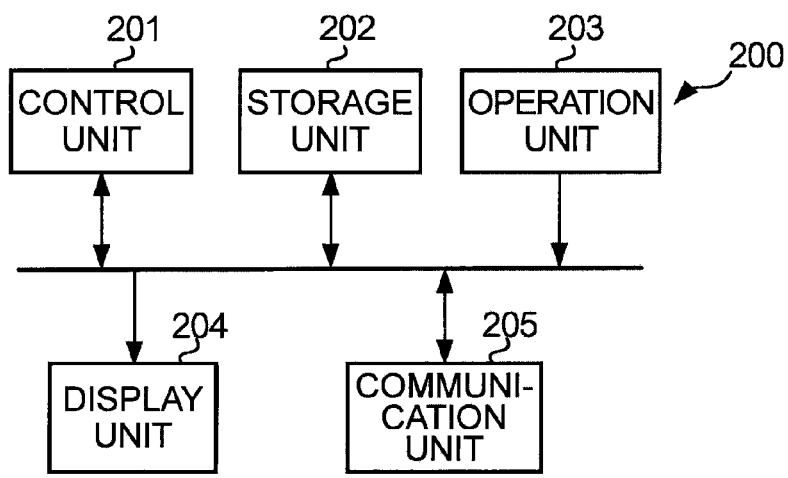
FIG. 6 is a diagram illustrating an example of a task type specification management table.
FIG. 7 is a block diagram illustrating a configuration of a client device.

FIG. 6 is a diagram illustrating an example of the task type specification management table 1053. The task type specification management table 1053 is used to specify a task type ID to be written to the task content management table 1052 on the basis of the process contents written to the process content management table 1051. Such a correlation can be made because plural process contents are combined and performed in a predetermined order when the image display device 100 performs a certain task. That is, by referring to the process content ID corresponding to the performed process and the order in which the process is performed, it can be uniquely specified what task contents are performed by the employee.

As shown in FIG. 6, in the task type specification management table 1053, the "process content ID" and the "task type ID" are correlated with each other. The "process content ID" is equivalent to that of the process content management table 1051 shown in FIG. 4 and the "task type ID" is equivalent to that of the task content management table 1052 shown in FIG. 5.

In the first row in the drawing, the process content ID "read→display→write→store" is correlated with the task type ID "preparation of document." "→" means that the processes corresponding to the process content ID are performed in the order of the arrow in time series. When the employee performs the task of preparing a document, the image display device 100 performs a series of processes of reading document data from the flash memory 105 in accordance with the employee's operation, displaying a document corresponding to the document data on the display unit 100D, writing data in accordance with the employee's operation of the operation unit 107 or the stylus pen 100S, and storing the document data in the flash memory 105. Accordingly, the correlation shown in the first row can be defined.

In the second row, the process content ID "display→write" is correlated with the task type ID "research." When the employee performs the task of research, the image display device 100 performs a series of processes of receiving a web page (file) for research from the database through the communication unit 106 in accordance with the employee's operation, displaying the web page on the display unit 100D, and writing a keyword (data) related to the research to an input form. In the research, the CPU 102 does not read document data from the flash memory 105 and does not store data in the flash memory 105. The process content is different from the task of preparing a document and thus the correlation shown in the second row can be defined.

A-3 Configuration of Client Device 200

A configuration of the client device 200 will be described now.

FIG. 7 is a block diagram illustrating a configuration of the client device 200. As shown in the drawing, the client device 200 includes a control unit 201, a memory unit 202, an operation unit 203, a display unit 204, and a communication unit 205. The control unit 201 includes a CPU controlling the entire device, a RAM providing a work area of operations, and a ROM storing various control programs and performs operations in the order described in the control programs. The memory unit 202 is a storage unit storing programs executed by the control unit 201 or data used to execute the programs and an example thereof is a hard disk unit. The operation unit 203 includes an input unit such as a keyboard or operators such as buttons and serves to receive a user's operation, to generate a control signal indicating the operation, and to supply the control signal to the control unit 201. The display unit 204 includes a liquid crystal panel and serves to display a menu picture, etc. for operating the client device 200 under the control of the control unit 201. The communication unit 205 is a communicator having a modem, etc. The control unit 201 transmits data received from the image display device 100 to the server 300 through the communication unit 205 or transmits data (for example, document data used to perform a task) received from the server 300 to the image display device 100. That is, the client device 200 serves to relay the data transmission between the image display device 100 and the server 300.

A-4 Configuration of Server 300

A configuration of the server 300 will be described now.

Figure 8:
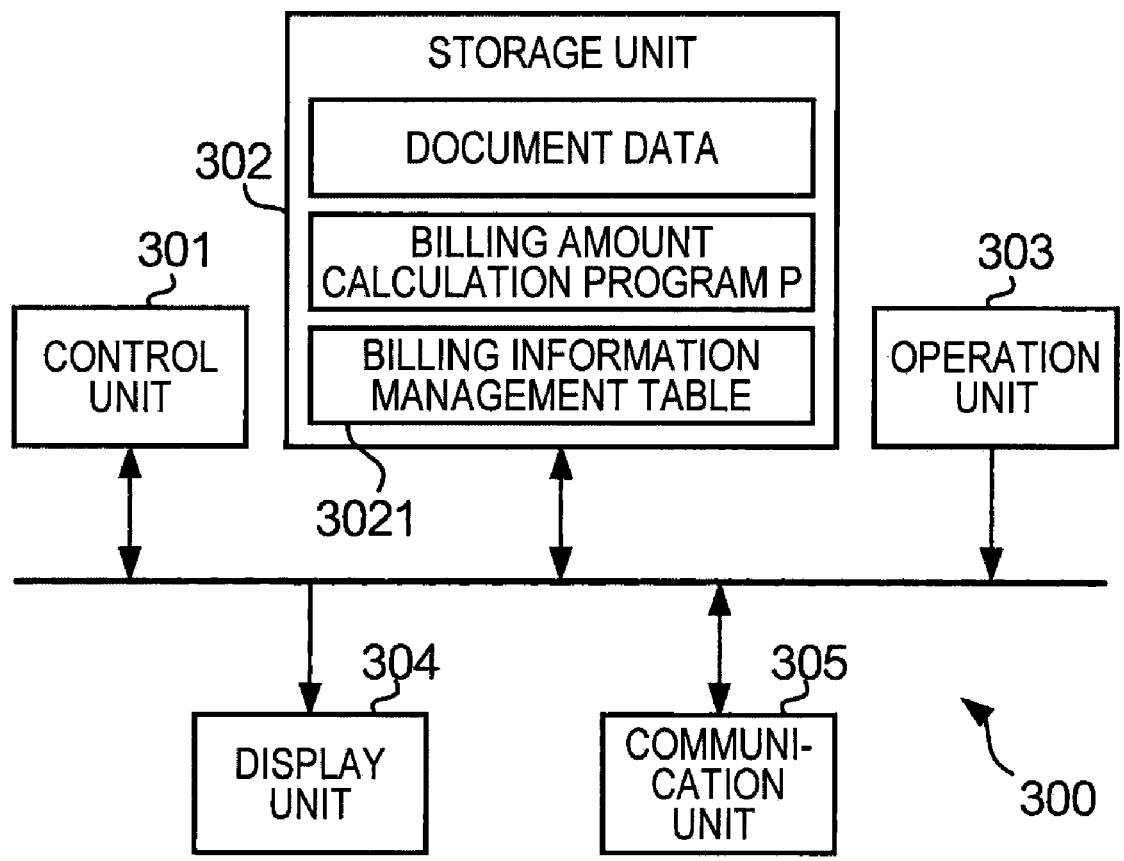
FIG. 8 is a block diagram illustrating a configuration of a server.

FIG. 8 is a block diagram illustrating a configuration of the server 300. As shown in the drawing, the server 300 includes a control unit 301, a memory unit 302, an operation unit 303, a display unit 304, and a communication unit 305. Since the configurations of the units are equivalent to those of a generalpurpose computer similarly to the client device 200, features of the server 300 will be mainly described now.

The memory unit 302 of the server 300 stores a billing information management table 3021 and a billing amount calculation program P in addition to document data used for a task. Information indicating a billing destination and information indicating a billing amount are written to the billing information management table 3021 on the basis of the attribute information and the contents of the tables of the image display device 100.

FIG. 9 is a diagram illustrating an example of the billing information management table 3021.

As shown in the drawing, in the billing information management table 3021, a "billing destination ID", a "document ID", a "task type ID", a "task time zone", a "task engagement period", and a "billing amount" are correlated with each other. Contents corresponding to the contents transmitted from the image display device 100 are written to the fields of the "document ID", the "task type ID", the "task time zone", and the "task engagement period." The billing amount calculated on the basis of the contents in the fields of the billing information management table 3021 and the billing amount calculation program P is written to the field of the "billing amount" by the control unit 301. For example, the first row represents that a task is performed on the document data having the billing destination ID "office ABC", the document ID "BBB.doc", and the task type ID "preparation of document" for "7:23" (7 hours and 23 minutes) in the task time zone "day" and the billing amount for the task is "¥135,000." In the second row, the destination ID, the task content, and the billing amount are written to the fields similarly.

The billing amount calculation program P serves to calculate an appropriate billing amount on the basis of the contents of the billing information management table 3021 and an algorithm reflecting assumable cost (such as labor cost, traffic expense, and sheet cost) necessary for performing a task. Specifically, task contents, correlations of the tasks with the billing amounts, and a procedure for calculating a billing amount to charge a billing destination on the basis of the correlations are described in the billing amount calculation program P.

A-5 Operation

Operations of this embodiment will be described now with reference to the drawings. In the following description, it is assumed that the fields of the tables shown in FIGS. 4, 5, and 9 are blank before operation of the image display device 100.

A-5-1 Operation of Image Display Device 100 Until Storing Task Content

An operation until an employee performs a task using the image display device 100 and the image display device 100 stores the task content will be first described. In the following description, it is assumed that an employee performs a task corresponding to the task type ID "preparation of document" on the document data (having the attribute information with the data structure shown in FIG. 3) representing document A.

Figure 10:
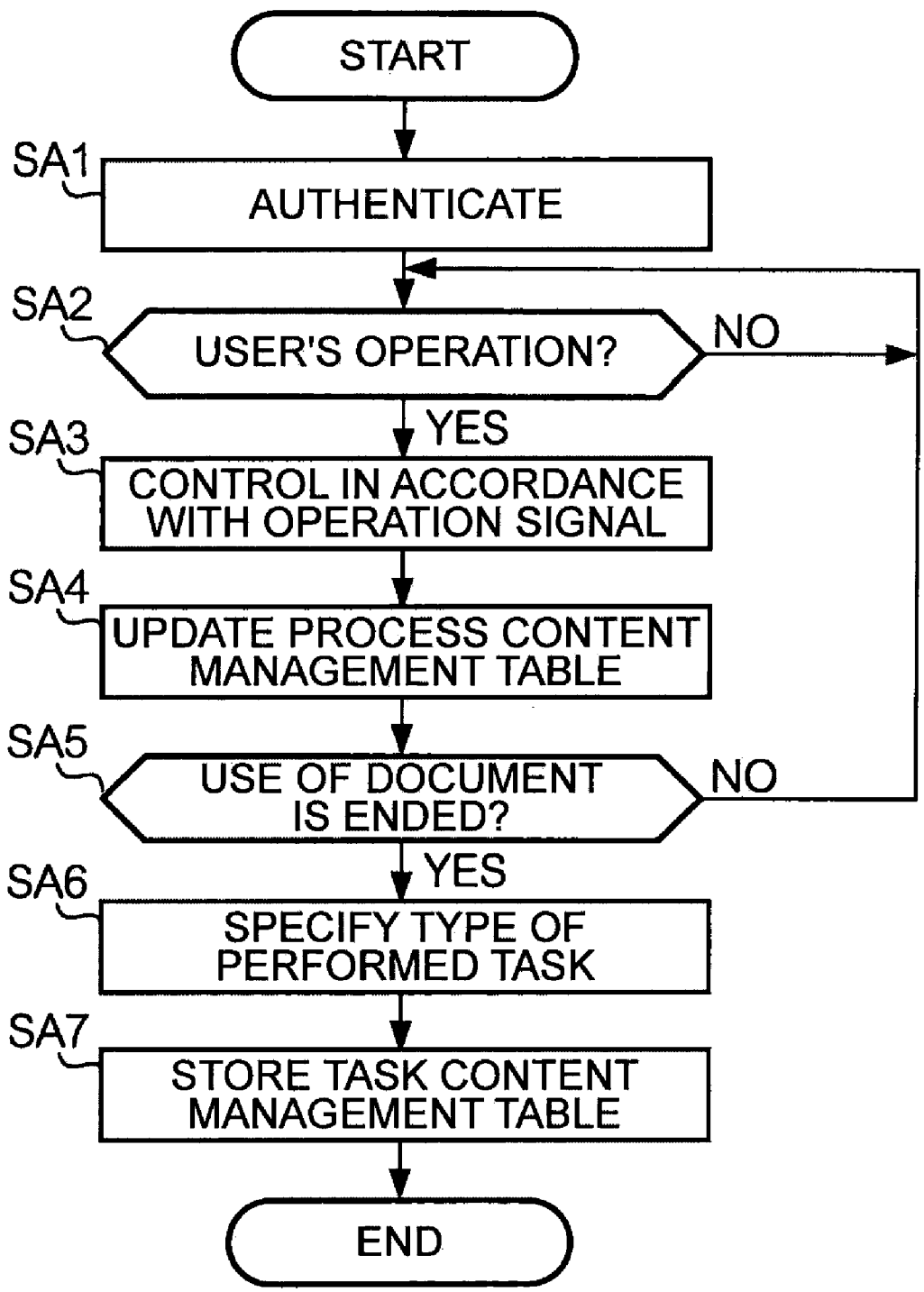
FIG. 10 is a flowchart illustrating a flow of processes performed by a CPU of the image display device.

FIG. 10 is a flowchart illustrating a flow of processes performed by the CPU 102 of the image display device 100. Here, the image display device 100 is not connected to the client device 200 through the communication cable and the employee performs a task by operating the image display device 100. It is assumed that the document data acquired from the server 300 in advance is stored in the flash memory 105 of the image display device 100.

First, the CPU 102 authenticates the employee using the image displace device (step SA1). A known method such as password authentication or fingerprint authentication can be used for the authentication. The CPU 102 can specify the employee performing the task by the authentication. The CPU 102 waits until the employee does any operation and it receives an operation signal from the operation unit 107 or receives a sensing signal from the touch screen 110 (NO in step SA2).

When the operation unit 107 is operated by the employee, the CPU 102 receives the operation signal corresponding to the operation and determines that an operation is performed (YES in step SA2). When it is assumed that an operation of instructing to display document A on the display unit 100D to start the preparation of a document, the CPU 102 makes a control in accordance with the received operation signal (step SA3). Specifically, the CPU 102 reads the document data stored in the flash memory 105 and displays document A on the display unit 100D by outputting the read document data to the display controller 108.

The CPU 102 updates the process content management table 1051 by writing the process content corresponding to the operation signal to the process content management table 1051 (step SA4). The CPU 102 performs two processes corresponding to the process content ID "read" and "display" in accordance with the employee's instruction. As shown in FIG. 11A, the CPU 102 writes the process content ID "read" and the document ID "AAA.doc" based on the attribute information of document A to the first row of the process content management table 1051 by the update. The CPU 102 acquires time information indicating the process start time and the process end time from the timer 111 and writes "10:00:27" to the fields of the process start time and the process end time. Then, the CPU 102 writes the document ID "AAA.doc" and the process content ID "display" to the second row and writes the process start time "10:00:28" on the basis of the time information acquired from the timer 111. In the process of displaying a document, since the state is maintained until it is instructed to end the display, the field of the process end time corresponding to the process content ID "display" is blank at this time.

The CPU 102 determines whether the use of document data is ended (step SA5). The "end of use of the document" means that the employee performs an operation of closing a window displaying the document and the CPU 102 performs a process of ending the display of document on the display unit 100D in response to the operation. Here, since the ending instruction is not given from the employee just before starting the preparation of document, the determination result of step SA5 is "NO" and the CPU 102 returns to step SA2 and waits until the employee performs a next operation.

When the employee operates the stylus pen 100S and touches soft buttons indicating keys of the keyboard displayed on the display unit 100D to input characters to the document, the CPU 102 receives the sensing signal corresponding to the touched position. When the employee instructs to write character "a", the CPU 102 performs a process of writing character "a" to the position corresponding to the sensing signal in step SA3. In step SA4, the CPU 102 updates the process content management table 1051. Specifically, as shown in FIG. 11B, the CPU 102 writes the document ID "AAA.doc" and the process content ID "write" to the third row of the process content management table 1051 and writes the process start time and the process end time "10:00:57" on the basis of the time information acquired from the timer 111.

In this way, by repeating the processes of steps SA2 to SA5, the CPU 102 performs a control operation in accordance with the employee's operation and updates the process content management table 1051. The CPU 102 stores the document data in the flash memory 105 and performs the process of step SA6 when the end of use of the document is instructed (YES in step SA5). At this time, the process content management table 1051 is shown in FIG. 4.

The CPU 102 reads the task type specification management table 1053 from the flash memory 105 and specifies the type of the task performed by the employee on the basis of the task type specification management table 1053 and the process content management table 1051 (step SA6). That is, the task type is specified every when the use of each document is ended. As shown in FIG. 4, the order of the process content IDs "read"→"display"→"write"→ . . . →"store" is written in time series in the process content management table 1051. Accordingly, the CPU 102 specifies that the task type ID of the task performed by the employee is "preparation of document" on the basis of the description in the first row of the task type specification management table 1053.

The CPU 102 updates and stores the task content management table 1052 on the basis of the specified task type ID and the process content management table 1051 (step SA7). The CPU 102 writes the specified task type ID "preparation of document" and the task time zone "day" based on the time information acquired from the timer 111 as shown in FIG. 12. Since the task engagement period is a period of time from the reading of the document to the end of display, the CPU 102 writes the task engagement period "3:42" which is the period of time from "10:00:27" to "13:42:50" on the basis of the process content management table 1051 shown in FIG. 4. Then, the CPU 102 stores the task content management table 1052 in the flash memory 105.

Thereafter, every time the image display device 100 displays a document in accordance with the employee's instruction, the above-mentioned processes are performed.

The CPU 102 deletes the details of the process content management table 1051 used to update the task content management table 1052 in steps SA6 and SA7. Since the details used to specify the task content are not used thereafter, it is preferable that the details are deleted to save the memory capacity of the flash memory 105.

The timing for specifying the task type ID is not limited to the above description, but may be the end of use of the image display device 100. That is, the CPU 102 logically or physically separates and manages the details of the process content management table 1051 by tasks in the flash memory 105, performs the processes of steps SA6 and SA7 when the employee instruct to end the operation, and then is turned off.

A-5-2 Operation Until Image Display Device 100 Transmit Task Content to Server 300

An operation until the image display device 100 transmits the task content to the server 300 will be described now.

Figure 13:
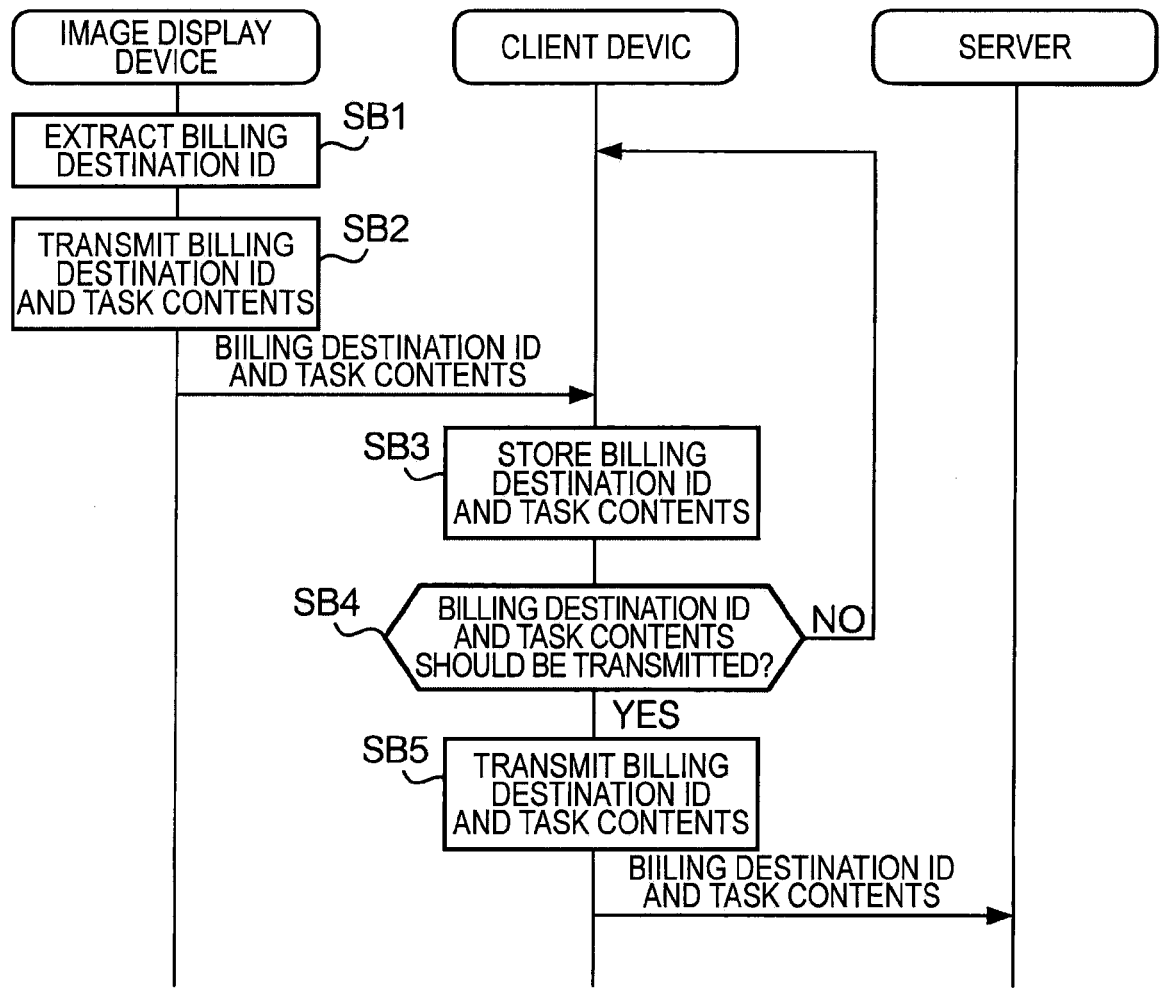
FIG. 13 is a sequence diagram illustrating a flow of processes performed by the image display device and the client device.

FIG. 13 is a sequence diagram illustrating a flow of processes performed by the task management system.

For example, when the employee does not perform any task, the employee connects the communication unit 106 of the image display device 100 to the communication unit 205 of the client device 200 by the use of the communication cable 500 to transmit the information on the task contents accumulated in the image display device 100 to the client device 200.

When the CPU 102 is instructed to transmit the task content by the employee's operation of the operation unit 107, the CPU 102 first extracts (generates) the billing destination ID for specifying the billing destination from the attribute information (step SB1). Then, the CPU 102 transmits the billing destination ID and the contents of tasks (hereinafter, simply referred to as "task content") written to the task content management table 1052 to the client device 200 (step SB2). Specifically, the CPU 102 correlates the billing destination ID "OΔ company" among the attribute information of document A shown in FIG. 3 with the task content described in the task content management table 1052 shown in FIG. 12 and transmits the correlated information.

When receiving the billing destination ID and the task content from the image display device 100, the control unit 201 of the client device 200 correlates the billing destination ID with the task content and stores the correlated data in the memory unit 202 (step SB3). Thereafter, the control unit 201 accumulates the task content even when receiving the task content from the image display device 100. Accordingly, the contents stored in the client device 200 are the same as those stored in the task content management table 1052 shown in FIG. 12.

The control unit 201 determines whether the billing destination ID and the task content written to the task content management table 1052 should be transmitted to the server 300 (step SB4). For example, when it is defined that the data is transmitted at a predetermined time once per week, the determination result of step SB4 is "NO" other than the predetermined time and the billing destination IDs and the task contents are accumulated in the memory unit 202 every time they are received. When it is defined that the details of the task content management table 1052 are transmitted every updating, the determination result of step SB4 is always "YES." When the control unit 201 of the client device 200 determines to transmit the details of the task content management table 1052 and the billing destination IDs (YES in step SB4), the control unit 201 transmits the data to the server 300 through the communication unit 205 (step SB5).

A-5-3 Operation After Server 300 Receives Task Content from Client Device 200

An operation of the server 300 after receiving the task content from the client device 200 will be described now.

Figure 14:
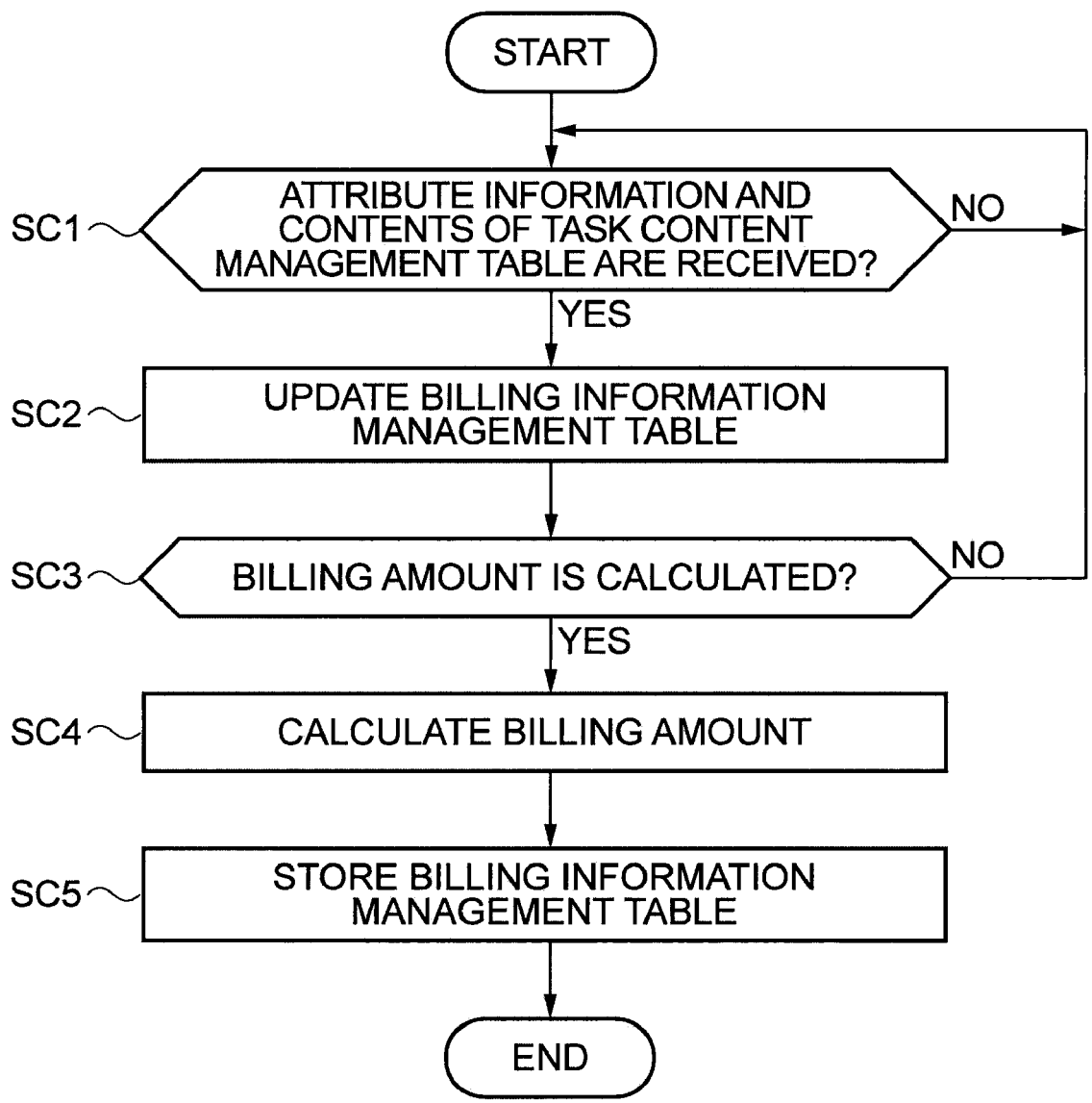
FIG. 14 is a flowchart illustrating a flow of processes performed by a controller of the server.

FIG. 14 is a flowchart illustrating a flow of processes performed by the control unit 301 of the server 300. When determining to receive the billing destination ID and the task content from the client device 200 (YES in step SC1), the control unit 301 of the server 300 updates the details of a billing information management table 3021 by writing the received data to the fields of the billing information management table 3021 of the memory unit 302 (step SC2). Here, the control unit 301 writes the details shown in FIG. 15A to the billing information management table 3021. At this time, the field of "billing amount" is blank.

The control unit 301 determines whether the billing amount should be calculated (step SC3). The control unit 301 determines that the billing amount is not calculated until a manager instructs the calculation or until a predetermined transmission timing comes (NO in step SC3). In the meantime, the control unit 301 only updates the billing information management table 3021 in step SC2.

When determining that the billing amount should be calculated (YES in step SC3), the control unit 301 reads the billing amount calculation program P and calculates the billing amount on the basis of the program and the details of the billing information management table 3021 (step SC4). At this time, for example, the control unit 301 calculates the billing amount "¥125,000" on the basis of the details described in the first row and writes the calculated billing amount as the billing amount information to the field of "billing amount." That is, the details of the billing information management table 3021 are as shown in FIG. 15B. The control unit 301 stores the details of the billing information management table 3021 updated in this way (step SC5).

Thereafter, the control unit 301 transmits the details to a printer not shown to print out the details, so as to issue bills to be transmitted to the billing destinations on the basis of the details of the billing information management table 3021. The control unit 301 may perform a display output operation of displaying the details on the display unit 304. The control unit 301 may perform a transmission output operation of transmitting the details to another system managing the billing amounts such as a main server through the communication unit 305. The control unit 301 may store the details in a recording medium such as a CD (Compact Disk) set into the server. In this way, the control unit 301 can output the details of the billing information management table 3021 in various forms to use the details for various purposes.

According to the first embodiment, even when an employee does not perform an operation of inputting the task contents, the image display device 100 used for performing the tasks can specify the task type on the basis of the process contents and generate information on the task content. The server device 300 can specify the billing destination and the billing amount as the price of the task on the basis of the attribute information and the task content. Since the employee does not input the task content, erroneous writing does not occur. Accordingly, according to the above-mentioned configuration, it is possible to accurately manage the task contents without giving a burden on a user.

B Second Embodiment

A second embodiment of the invention will be described.

The second embodiment is different from the first embodiment in destination when the image display device 100 transmits the billing destination ID and the task content. Specifically, in a task management system according to the second embodiment, a printer 400 is provided instead of the client device 200 and the server 300 and the billing destination ID and the task content are transmitted to the printer. Other operations and configurations are the same as the first embodiment and thus the difference from the first embodiment will be mainly described below.

B-1 Configuration

Figure 16:
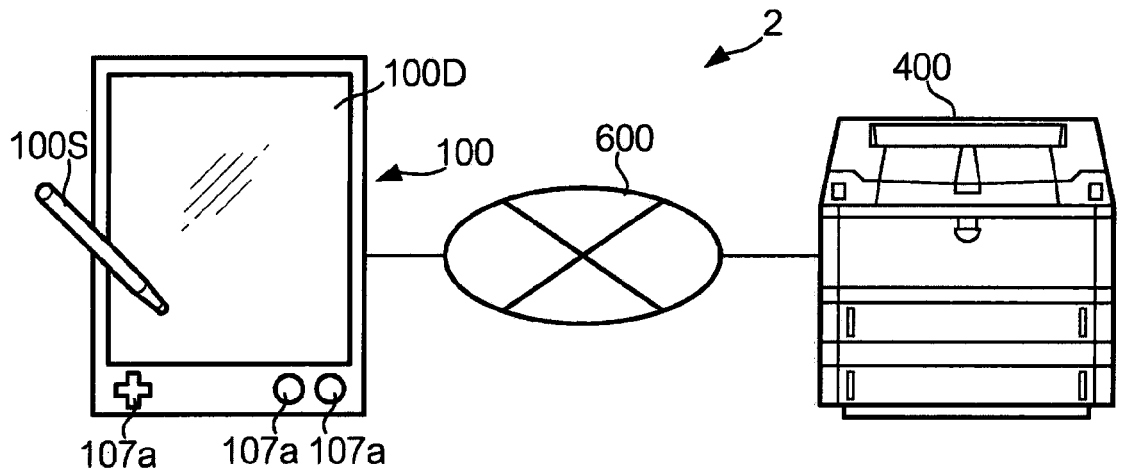
FIG. 16 is a diagram schematically illustrating a configuration of a task management system according to a second embodiment of the invention.

FIG. 16 is a diagram schematically illustrating the task management system 2 according to the second embodiment. As shown in the drawing, the task management system 2 includes an image display device 100 and a printer 400. The image display device 100 and the printer 400 are communicably connected to each other through a LAN 600 as needed and thus can transmit and receive data from each other. The printer 400 receives data on the task contents from the image display device 100 and prints the corresponding details on a printing sheet (printing medium).

Figure 17:
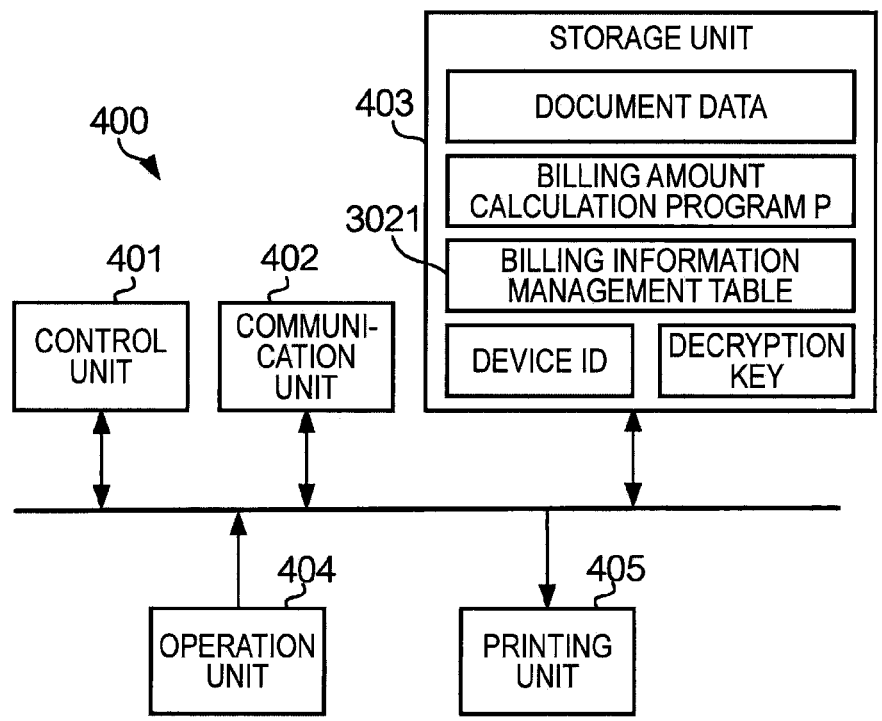
FIG. 17 is a block diagram illustrating a configuration of a printer according to the second embodiment of the invention.

FIG. 17 is a block diagram illustrating a configuration of the printer 400. As shown in the drawing, the printer 400 includes a control unit 401, a communication unit 402, a memory unit 403, an operation unit 404, and a printing unit 405. The control unit 401, the communication unit 402, the memory unit 403, and the operation unit 404 have configurations equivalent to those of the client device 200 or the server 300. The printing unit 405 prints the details of the billing information management table 3021 on a printing sheet. The memory unit 403 stores the billing information management table 3021 stored in the memory unit 302 of the server 300 according to the first embodiment and the billing amount calculation program P for calculating the billing amount of a billing destination. The memory unit 302 stores "device ID" which is identification information assigned to the printer and "decryption key" assigned to the printer. Different "device IDs" are assigned to the printers 400.

On the other hand, the image display device 100 stores the device ID of the printer 400 to which the transmission of task contents is permitted and an encryption key corresponding to the decryption key stored in the printer 400 in the flash memory 105. The encryption scheme may be a common key scheme or a public key scheme.

The reason for using the device ID and the encryption key (decryption key) will be described now.

The task contents managed by the task management system 2 often include information having a confidential property within a company. Accordingly, when the information is revealed to a third party for a certain reason, a great problem may be caused, thereby requiring strict management of such information. Therefore, when the image display device 100 intends to output such information, it permits only the transmission to a predetermined device. Specifically, the billing destination ID and the encryption key are stored in advance in the flash memory 105 of the image display device 100 and the image display device 100 transmits the billing destination ID and the task content to only the printer 400 to which the device ID corresponding to the device ID stored in the printer. By transmitting and receiving the encrypted data, higher security is guaranteed.

B-2 Operation

Operations of the task management system 2 will be described now.

Figure 18:
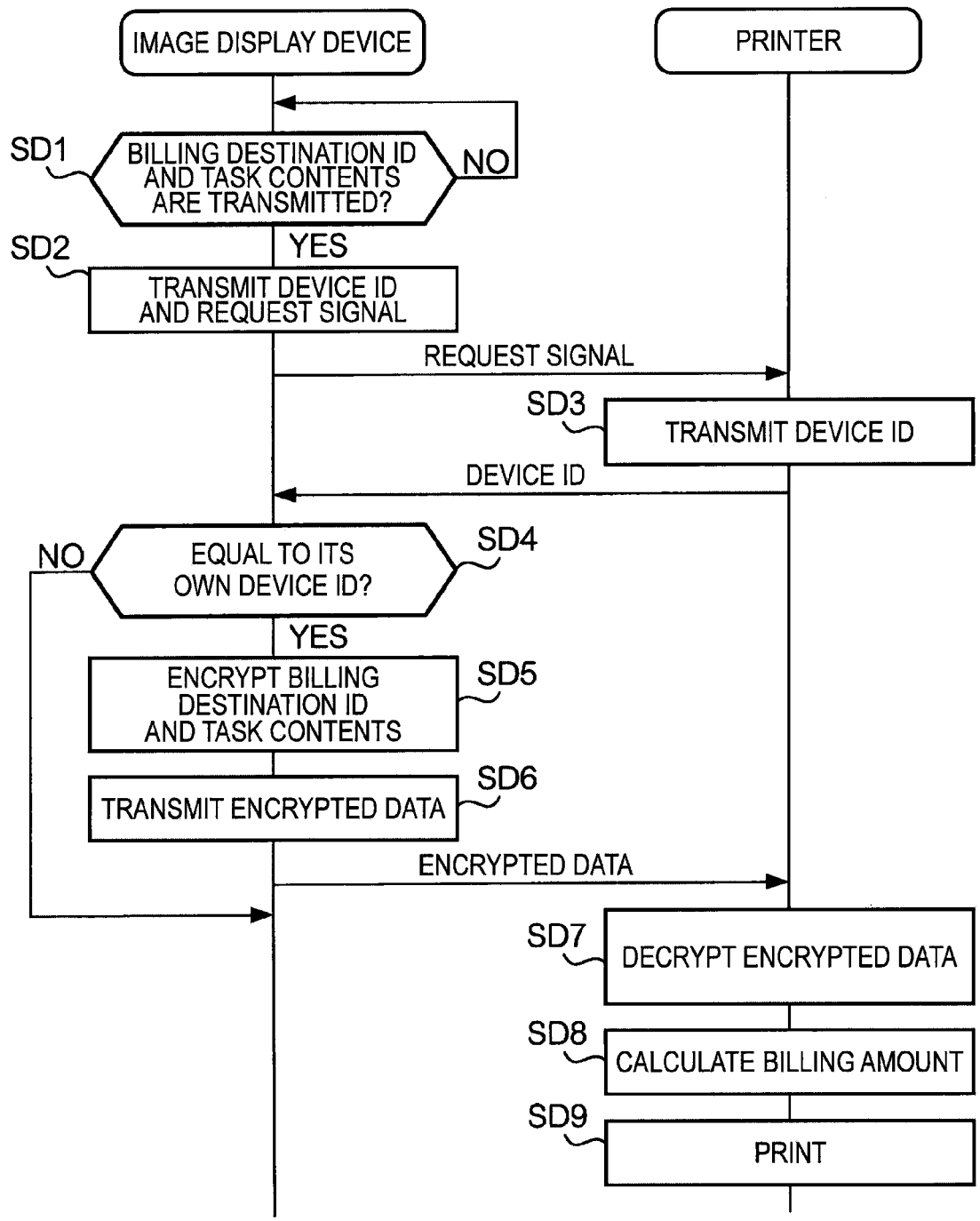
FIG. 18 is a sequence diagram illustrating a flow of processes performed by the task management system according to the second embodiment of the invention.

FIG. 18 is a sequence diagram illustrating a flow of processes performed by the task management system 2. The operations of the image display device 100 until it writes the task content to the task content management table 1052 and transmits the task content are similar to those of the first embodiment and thus description thereof is omitted.

First, when determining that the billing destination ID and the task content should be transmitted to the printer (YES in step SD1), the CPU 102 of the image display device transmits a request signal for requesting for transmission of the device ID to the printer 400 through the communication unit 106 in response to an employee's operation of the operation unit 107 (step SD2). When receiving the request signal through the communication unit 402, the control unit 401 of the printer reads the device ID assigned to the printer stored in the memory unit 403 and transmits the read device ID to the image display device 100 through the communication unit 402 (step SD3). When receiving the device ID, the CPU 102 of the image display device 100 determines whether the received device ID corresponds to the device ID stored in the flash memory 105 of the printer (step SD4). Here, when determining that both device IDs correspond to each other (YES in step SD4), the CPU 102 encrypts the billing destination ID and the task content by the use of the encryption key (step SD5) and transmits the encrypted data to the printer 400 (step SD6). When receiving the encrypted data, the control unit 401 of the printer 400 decrypts the encrypted data by the use of the decryption key (step SD7), writes the decrypted data to the fields of the billing information management table 3021, and calculates the billing amount on the basis of the billing amount calculation program P (step SD8). The control unit 401 allows the printing unit 405 to print the details corresponding to the billing information management table 3021 (step SD9). The matter to be printed out is a bill to be transmitted to the billing destination or a specification having the billing amount written thereto managed within the company.

On the other hand, when the CPU 102 determines in step SD4 that both device IDs do not correspond to each other (NO in step SD4), the CPU does not transmit the details of the task content management table 1052.

The second embodiment has the same advantages as the first embodiment. In addition, since the printer 400 prints the output of the image display device 100 depending on the output details, the system configuration is further simplified.

Since the destination of the task content is determined on the basis of the device ID stored in advance or the encrypted data is transmitted, the second embodiment is excellent in security.

C MODIFIED EXAMPLES

The above-mentioned embodiments may be modified as follows. Specifically, the following modifications can be considered. The modifications may be properly combined.

C-1 Modified Example 1

In the embodiment, the control unit 301 of the server 300 uses the "billing destination ID" as the attribute information for specifying the billing destination. However, the billing destination may be specified from attribute information other than the billing destination ID. For example, when a character string indicating the document ID includes a character string capable of specifying a billing destination, the billing destination may be specified on the basis of the document ID. When a character string indicating the task ID includes a character string capable of specifying the billing destination, the billing destination can be specified on the basis of the task ID.

In brief, the control unit 301 extracts the attribute information for specifying the billing destination from the attribute information acquired by the image display device 100 and generates the billing destination information indicating the billing destination on the basis of the extracted attribute information. In this case, when the attribute information acquired from the image display device 100 includes attribute information for specifying the billing destination and attribute information for not specifying the billing destination, the attribute information for specifying the billing destination can be extracted. When the attribute information acquired from the image display device 100 includes only attribute information for specifying the billing destination, the attribute information can be extracted.

Accordingly, it is preferable that the attribute information for specifying the billing destination includes at least one of the destination ID, the document ID, and the task ID. However, the billing destination may be specified from other attribute information.

C-2 Modified Example 2

In the above-mentioned embodiment, the image display device 100 transmits the task content written to the task content management table 1052 as the information for specifying the billing amount and transmits the billing destination ID extracted from the attribute information added to the document data, and the server 300 writes the billing destination ID to the billing information management table 3021.

However, the image display device 100 may transmit only the task content and the control unit 301 of the server 300 may specify the billing destination from the task content. For example, when the company has only one client and the server 300 receives the details of the task content management table 1052, the billing amount is generated at once and the control unit 301 can specify the billing destination. When the task types to be performed are different by clients, the control unit 301 can uniquely specify the billing destination from the task type ID written to the task content management table 1052.

The billing amount may be specified on the basis of only the attribute information. In this case, the image display device 100 may not transmit the details of the task content management table 1052. For example, when only one type of task is performed, the billing amount per task may be determined uniformly. In this case, the memory unit 302 of the server 300 stores a program describing the correlation of the attribute information with the billing amount and the control unit 301 calculates the billing amount on the basis of the program and the number of tasks.

In this way, since the billing destination ID and the billing amount can be specified by only one of the details of the task content management table 1052 and the attribute information, the server 300 can properly change the setting to change the details to be transmitted to the image display device 100.

C-3 Modified Example 3

In the above-mentioned embodiment, the image display device 100 specifies the billing destination from the attribute information of the document data such as the billing destination ID. However, instead, the billing destination may be specified from the process content ID. This example will be specifically described below.

For example, it is assumed that the document data of the respective billing destination are stored in storage areas (that is, folders) separated by the billing destinations in the memory area of the flash memory 105. It is also assumed that correlations of identification information (folder ID) for identifying the folders with the billing destination IDs determined for the respective folders are stored in advance in the flash memory 105. In this configuration, the CPU 102 of the image display device 100 can specify the billing destination for the document data by specifying the folder in which the document data is stored and specifying the billing destination ID corresponding to the specified folder.

For example, to specify the billing destination on the basis of the read destination folder of the document data, the image display device 100 according to this modified example further finely divides the process content ID "read" and assigns different process content IDs of "read" to the folders from which the document data is read. For example, the process content ID is made to include the folder ID along with the process content ID "read" in the above-mentioned embodiment. For example, when the document data is read from the folder with the folder ID "bankA-group", the process content ID is "read (bankA-group)."

Operations of this modified example different from the above-mentioned embodiment will be mainly described now.

When an employee performs a task and the CPU 102 is instructed to read document data from the flash memory 105, the CPU 102 reads the document data from the instructed folder and writes the process content ID of the folder to the process content management table 1051 (steps SA3 and SA4). The CPU 102 performs the processes of steps SA5 to SA7. However, the CPU 102 does not delete but store at least the process content ID relating to the reading of the document data in the process content management table 1051, even after step SA7. In step SB1, the CPU 102 generates the billing destination ID for specifying the billing destination from the process content ID written to (stored in) the process content management table 1051, when the transmission of the task content is instructed by the employee. Specifically, when the process content ID is "read (bankA-group)", the CPU 102 extracts "bankA-group" corresponding to the folder ID for specifying the billing destination from the process content ID "read (bankA-group)." Then, the CPU 102 generates the billing destination information for specifying the billing destination ID on the basis of the extracted folder ID "bankA-group" and the correlation of the folder ID with the billing destination ID stored in the flash memory 105. Since the operations other than the operations relating to generating the billing destination ID are the same as the above-mentioned embodiment, the task management system performs the same processes as the embodiment.

When the CPU 102 storing the document data in the flash memory 105 (process content ID "store"), it is possible to generate the billing destination information by finely dividing and storing the process content ID "store" in the unit of folder ID and specifying the billing destination ID on the basis of the folder ID extracted from the process content ID at the time of generating the billing destination ID.

When the CPU 102 performs the transmission process of transmitting the document data to an external device (external server, etc.) (process content ID "transmit"), the destination devices may be different by the billing destinations. In this case, the CPU 102 can extract a transmitting address of the document data as the information (hereinafter, referred to as "transmission destination ID") for specifying the billing destination. In this case, the CPU 102 finely divides and stores the process content ID "transmit" in the unit of transmission destination IDs and stores the correlation of the transmission destination ID with the billing destination ID in the flash memory 105. Then, when the CPU 102 generates the billing destination ID, the CPU 102 extracts the transmission destination ID from the process content ID assigned by transmission destination IDs and generates the billing destination information by specifying the billing destination ID on the basis of the extracted transmission destination ID and the correlation stored in the flash memory 105.

In this case, when the process content IDs "read", "store", and "transmit" are not different by the billing destination IDs but the CPU 102 can specify the folders or the transmission addresses of the reading source and the storage destination, the billing destination ID can be specified. Accordingly, in the process content management table, the folder ID or the transmission destination ID capable of specifying the billing destination may be correlated with the process content ID.

As described above, the image display device 100 can specify the billing destination ID on the basis of the process content ID to generate the billing destination information and can specify the billing destination even when the attribute information is not added to the document data in this example.

C-4 Modified Example 4

In the above-mentioned embodiment, the CPU 102 of the image display device 100 generates the task type ID on the basis of the process content ID written to the process content management table 1051 and the process content ID written to the task type specification management table 1053. However, the CPU 102 may use the "process start time" or the "process end time" of the process contents written to the process content management table 1051. For example, in the embodiment, when the process corresponding to the process content ID "read→display" is performed, the task type ID "research" is specified. However, the task corresponding to the research often requires much time for extracting information and thus the period of time from the start time of the display process to the end time thereof can be considerably great. Accordingly, for example, a condition that the period of time of the display process is "20 minutes or more" may be correlated with the "research" of the task type specification table 1053 and the CPU 102 may specify the task type ID on the basis of the condition. Accordingly, when plural types of tasks performed by performing the same procedure exist, the tasks may be distinguished on the basis of the period of time when the processes are performed and the task type ID can be specified more precisely. The number of times for performing the processes may be defined in some task types.

C-5 Modified Example 5

The server 300 may further correlate the identification information (hereinafter, referred to as "employee ID") for identifying the employee performing the task in the billing information management table 3021 having the configuration shown in FIG. 9. As shown in FIG. 10, since the image display device 100 performs the authentication operation on the employee in step SA1, the image display device 100 transmits the employee ID specified by the authentication operation along with the task content and the billing destination ID. The server 300 specifies the task performer depending on the employee ID.

In this way, since the server 300 can manage the sales (corresponding to the billing amount) or the task contents of the employee, it is advantageous in the task management within the company such as valuation or check of attendance within the company, in addition to the billing.

In the billing information management table 3021, the date for performing a task, the total billing amount of the company per month, and the billing amount per billing destination may be written thereto. When calculating the billing amount, the server 300 may leave the billing destination ID and delete only the item about the task contents from the billing information management table 3021.

C-6 Modified Example 6

The processes performed by the image display device 100, the client device 200, and the server 300 are not limited to those described in the above-mentioned embodiments.

For example, in the embodiment, the CPU 102 of the image display device 100 specifies the task type ID on the basis of the process content management table 1051 and the task type specification management table 1053. However, the client device 200 may store the task type specification management table 1053 in the memory unit 202 and the control unit 201 may specify the task type ID on the basis of the details of the process content management table 1051 received from the image display device 100 and transmit the specified task type ID to the server 300. Of course, the server 300 may store the task type specification management table 1053 and specify the task type ID.

The client device 200 may calculate the billing amount. In this case, the client device 200 can store the billing amount calculation program P and the billing information management table 3021 in the memory unit 202 and calculate the billing amount on the basis of them. In this way, by only operating the client device 200, an employee can know his or her sales (billing amount). Of course, the image display device 100 may calculate the billing amount.

C-7 Modified Example 7

The process content ID or the task type ID is only an example, and other process content ID or task type ID may be provided.

For example, at least one of the process contents "read", "write", "store", "transmit", and "print" may be defined as the process content.

When plural types of tasks of preparing a document exist, the billing amounts may be different depending on the tasks and thus the ID of the document preparing task may be more finely divided. That is, they can be changed in design depending on a use for the task management system.

For example, in case of a company performing a task of preparing a web page or a computer program in response to a client's request, the process content ID "set hyperlink" of setting a hyper link on the document data is provided. When the image display device specifies the task type ID and the process content IDs are "read"→"display"→"write"→"set hyperlink"→"store", the task of preparing a web page is specified. When the process content IDs are "read"→"display"→"write"→"store", the task of preparing a program is specified.

As long as the attribute information includes information capable of specifying the billing destination, it does not need to include all the items shown in the above-mentioned embodiment and items including similar information may be provided. The server 300 may not specify the billing destination on the basis of the billing destination ID, but specify the billing destination on the basis of the task ID or the document ID. In this case, in steps SB1 and SB2, the image display device 100 can extract and transmit the task ID or the document ID from the attribute information.

The title of the task instead of the task type ID may be included in the task content. In this case, instead of the "task type ID", the "title of the task" is written to the task content management table 1052.

C-8 Modified Example 8

In the second embodiment, the image display device 100 allows the printer 400 disposed in the same company to print the details of the billing information management table 3021. However, when the printer is disposed in an employee's home, the task management system may be configured as follows, by applying the printer to the task management system 1 according to the first embodiment. In this example, it is assumed that the configuration of the task management system disposed within the company is the same as the task management system 1 according to the first embodiment and the printer having a configuration equivalent to that of the second embodiment is disposed in the employee's home.

For example, when the employee returns home with the image display device 100 and performs a task, the employee may print the details of the document data on the task by the use of his or her own printer after performing the task. However, when the employee's printer is made to perform the printing operation, the employee should pay the cost (hereinafter, referred to as "printing cost") required for the printing operation such as sheet expenses or ink cartridge expenses. Accordingly, the employee may hesitantly perform the printing operation at home and thus deteriorate the task efficiency.

Accordingly, when a specific printer, that is, an employee's printer, is made to perform a printing operation (process content ID "print"), the image display device 100 according to this modified example accumulates the process content ID so as to understand the fact. Accordingly, in this modified example, the device ID described in the second embodiment is used. Specifically, the device ID assigned to the employee's printer is stored in advance in the flash memory 105 of the image display device 100. The process content ID "print" is finely divided and the process content ID is different depending on the fact whether the printer performing the printing operation is possessed by the employee. That is, the process content ID "print" in the above-mentioned embodiment further includes information (possession ID) indicating whether the printer is possessed by the employee. For example, the process content ID when the employee's printer performs the printing operation is "print-employee" and the process content ID when other printers except the specific printer perform the printing operation is "print-other."

Operations of the task management system according to this modified example different from those of the first embodiment will be mainly described now.

In step SA3, the CPU 102 acquires the device ID from the printer before or after allowing the printer to perform the printing operation. In step SA4, the CPU 102 compares the acquired device ID with the device ID stored in the flash memory 105 and determines whether the employee's printer performs the printing operation on the basis of the comparison result. Here, when determining that the acquired device ID corresponds to the device ID stored in the flash memory 105, the CPU 102 allows the employee's printer to perform the printing operation and thus writes the process content ID "print-employee" to the process content management table. At this time, the CPU 102 correlates and stores the numbers of printing sheets in the printing operations corresponding to the process content IDs in the process content ID management table. On the other hand, when the CPU 102 determines that the device IDs do not correspond to each other, it means that a printer other than the employee's printer is made to perform the printing operation and thus the process content ID "print-other" is written to the process content ID management table. Then, the CPU 102 performs the processes of steps SA5 to SA7. However, the CPU 102 does not delete the details (number of printing sheets) on the process content ID "print-employee" from the process content management table and accumulates the details even after step SA7.

When the employee instructs to transmit the task content, the CPU 102 of the image display device 100 transmits the number of printing sheets in the printing operation corresponding to the process content ID "print-employee" accumulated in the process content management ID table along with the billing destination ID or the task content in step SB2. When receiving the data, the client device 200 transmits the same data to the server 300 in step SB5. When receiving the data from the client device 200, the server 300 writes the billing destination ID and the task content to the billing information management table and stores the accumulated number of printing sheets corresponding to the received process content ID "print-employee." At the time of generating the billing amount information, the server 300 calculates the printing cost on the basis of the number of printing sheets and a predetermined algorithm (for example, multiplying the printing cost per sheet by the number of printing sheets) and correlates the printing cost with the billing amount information to store by writing the calculated printing cost as the identification information indicating that the printing operation is performed by the specific (employee's) printer to a predetermined field of the billing information management table.

The printing cost paid by the employee can be known referring to the billing information management table and thus a manager, etc. can repay the printing cost to the employee (pay the corresponding money).

In this example, the identification information indicating that the printing operation is performed by the specific printer can identify the printer having performed the printing operation and can be preferably used to request for the printing cost paid by the employee. Accordingly, the details are not limited to the above description. For example, in the configuration in which an external device calculates the printing cost, the number of printing sheets or the number of process content IDs accumulated in the image display device 100 may be used as the identification information.

When the employee performs the printing operation at home without careful consideration, the details of the document data may be revealed to a third party. Accordingly, similarly to the second embodiment, it is preferable that security is guaranteed by transmitting and receiving the encrypted data. When the employee instructs to perform the printing operation, the image display device 100 may determine whether the printing cost should be paid by the employee on the basis of the specified type of the printer instead of the device ID. In this case, the different process content ID can be assigned depending on the device type information indicating the type of the device. It is preferable that the CPU 102 can specify whether the printer to perform the printing operation is possessed by the employee without changing the process content ID "print" depending on the device ID. Accordingly, the device ID may be correlated with the process content ID "print" in the process content management table.

According to this configuration, the payment of the printing cost which is a problem when an employee performs a task at his or her home can be solved by using the function of the task management system.

C-9 Modified Example 9

In the above-mentioned embodiment, a wired communication path such as the communication cable 500 or the LAN 600 is used as the communication path for allowing the image display device 100, the client device 200, and the server 300 to communicate with each other. However, the Bluetooth (registered trademark), the UWB (Ultra Wide Band), and the IEEE (Institute of Electrical and Electronic Engineers) 802.11b as a wireless communication path may be used. The invention can be applied to any, as long as it is a communication path allowing plural devices to transmit and receive information.

C-10 Modified Example 10

In the above-mentioned embodiment, the image display device 100 used as a task terminal is a portable display device. However, display devices such as a desktop computer, a mobile computer, and other portable communication terminals may be used.

The control programs executed in the above-mentioned task management systems 1 and 2 can be provided in a state where the programs are recorded in a recording medium such as a magnetic tape, a magnetic disk, a flexible disk, an optical recording medium, a magneto-optical recording medium, a CD, a DVD, and a RAM.

Japanese Patent Application No. 2007-310000 filed on Nov. 30, 2007, is hereby incorporated by reference in its entirety.

What is claimed is:

1. A task management system comprising:
   an attribute information acquiring unit that acquires attribute information, the attribute information indicating an attribute corresponding to document data of a document;
   a billing destination information generator that extracts a billing destination of a cost resulting from performance of a task and that generates billing destination information indicating the billing destination, the billing destination being extracted from the attribute information acquired from the document;
   a process content information storage that stores process content information indicating a content of a process performed on the document data by a task terminal used by a task performer;
   a task content specifier that monitors use of the document by the task performer to determine an order of processes performed on the document and that identifies a content of the task performed on the document by the task performer based on the process content information stored in the process content information storage and the order of the processes performed on the document;
   a cost correlation storage that stores a correlation of the content of the task and a cost associated with the performance of the task;
   a billing amount information generator that generates billing amount information indicating an amount to be billed to the billing destination based on the content of the task specified by the task content specifier and the correlation stored in the cost correlation storage; and
   a billing information storage that correlates and stores the billing destination information and the billing amount information,
   wherein the process content information stored in the process content information storage is information on at least one of a process of reading document data, a process of displaying a document based on the document data, a process of searching for the document data, a process of writing data to the document data, a process of transmitting the document data to an external device, a process of storing the document data, and a process of printing the document data in the task terminal,
   wherein the process content information on the process of printing the document data includes device identification information assigned to a printer having performed the printing operation or device type information indicating the type of the printer, and
   wherein the task management system further comprises:
      a device storage storing the device identification information or the device type information assigned to a specific printer; and
      an identification information storage correlating and storing identification information indicating that the specific printer performs the printing operation with the billing amount information generated by the billing amount information generator, when the device identification information or the device type information included in the process content information is the device identification information or the device type information stored in the device storage.

2. The task management system according to claim 1, wherein the billing information storage correlates and stores the content of the task specified by the task content specifier with the billing destination information and the billing amount information.

3. The task management system according to claim 1, further comprising an output unit outputting the data stored in the billing information storage by the use of at least one of a print output, a display output, and a transmission output.

4. The task management system according to claim 1, wherein the cost correlation storage correlates and stores the attribute information with the cost, and
   wherein the billing amount information generator generates the billing amount information on the basis of the attribute information acquired by the attribute information acquiring unit and the correlation of the cost and the attribute information stored in the cost correlation storage.

5. The task management system according to claim 1, wherein the billing destination information generator includes a storage storing the correlation of the content of the task and the billing destination information, and
wherein the billing destination information generator generates the billing destination information on the basis of the content of the task specified by the task content specifier and the correlation stored in the storage.

6. The task management system according to claim 1, wherein the attribute information for specifying the billing destination includes at least one of billing destination identification information assigned to the billing destination, task identification information assigned to the task, and document identification information assigned to the document data.

7. The task management system according to claim 1, wherein the content of the task specified by the task content specifier includes at least one of a title or type of the task and a task time zone or task engagement period when a task performer performs the task.

8. The task management system according to claim 1, further comprising:
an authentication information storage correlating and storing identification information assigned to a task performer and authentication information for authenticating the task performer;
an authentication information acquiring unit acquiring authentication information of a task performer from the task terminal; and
an authentication unit checking the authentication information acquired by the authentication information acquiring unit with the authentication information stored in the authentication information storage and specifying identification information correlated and stored in the authentication information storage with the corresponding authentication information,
wherein the billing information storage correlates and stores the billing destination information and the billing amount information with the identification information specified by the authentication unit.

9. A task management system comprising:
a process content information storage that stores process content information indicating a content of a process performed on document data by a task terminal used by a task performer,
wherein the process content information stored in the process content information storage is information on at least one of a process of reading the document data, a process of displaying the document based on the document data, a process of searching for the document data, a process of writing data to the document data, a process of transmitting the document data to an external device, a process of storing the document data, and a process of printing the document data in the task terminal, and
wherein the process content information on the process of printing the document data includes device identification information assigned to a printer having performed the printing operation or device type information indicating the type of the printer;
a storage that stores a correlation of the process content information and billing destination information indicating a billing destination of a cost resulting from performance of the task on the document data;
a billing destination information generator that extracts process content information specifying the billing destination information of a cost from the process content information stored in the process content information storage and that generates the billing destination information based on the extracted process content information and the correlation stored in the storage;
a task content specifier that monitors use of the document data by the task performer to determine an order of processes performed on the document data and that identifies a content of the task performed on the document data by the task performer based on of the process content information stored in the process content information storage and the order of the processes performed on the document data;
a cost correlation storage that stores a correlation of the content of the task and the cost caused as the price of the performance of the task;
a billing amount information generator that generates billing amount information indicating a billing amount for the billing destination based on the content of the task specified by the task content specifier and the correlation stored in the cost correlation storage; and
a billing information storage that correlates and that stores the billing destination information generated by the billing destination information generator and the billing amount information generated by the billing amount information generator;
a device storage storing the device identification information or the device type information assigned to a specific printer; and
an identification information storage correlating and storing identification information indicating that the specific printer performs the printing operation with the billing amount information generated by the billing amount information generator, when the device identification information or the device type information included in the process content information is the device identification information or the device type information stored in the device storage.

10. The task management system according to claim 9, wherein the billing information storage correlates and stores the content of the task specified by the task content specifier with the billing destination information and the billing amount information.

11. The task management system according to claim 9, further comprising an output unit outputting the data stored in the billing information storage by the use of at least one of a print output, a display output, and a transmission output.

12. The task management system according to claim 9, wherein the content of the task specified by the task content specifier includes at least one of a title or type of the task and a task time zone or task engagement period when a task performer performs the task.

13. The task management system according to claim 9, further comprising:
an authentication information storage correlating and storing identification information assigned to a task performer and authentication information for authenticating the task performer;
an authentication information acquiring unit acquiring authentication information of a task performer from the task terminal; and
an authentication unit checking the authentication information acquired by the authentication information acquiring unit with the authentication information stored in the authentication information storage and specifying identification information correlated and stored in the authentication information storage with the corresponding authentication information,
wherein the billing information storage correlates and stores the billing destination information and the billing amount information with the identification information specified by the authentication unit.

14. A task management system comprising an image display device and a printer,
wherein the image display device includes:
a processor that displays a document corresponding to document data and that performs a process instructed by a task performer on the document;
an attribute information acquiring unit that acquires attribute information indicating an attribute of a document corresponding to document data;
a billing destination information generator that extracts attribute information specifying a billing destination of a cost resulting from performance of a task using the document data from the attribute information acquired by the attribute information acquiring unit and that generates billing destination information indicating the billing destination based on of the extracted attribute information;
a process content information storage that stores process content information indicating a content of a process performed on the document data by the processor;
a task content specifier that monitors an order of the processes instructed by the task performer on the document and that identifies a content of the task performed on the document data based on the process content information stored in the process content information storage and the order of the processes instructed by the task performed;
an identification information storage that stores identification information assigned to a printer allowed to print out the data transmitted from the image display device; and
a transmitter that transmits the billing destination information and the content of the task specified by the task content specifier to the printer to which the identification information stored in the identification information storage is assigned, and
wherein the printer includes:
a receiver that receives the billing destination information transmitted from the transmitter of the image display device and the content of the task;
a cost correlation storage that stores a correlation of the content of the task and the cost caused as a price of the performance of the task;
a billing amount information generator that generates billing amount information indicating a billing amount for the billing destination specified by the billing destination information received by the receiver on the basis of the content of the task received by the receiver and the correlation stored in the cost correlation storage;
a billing information storage that correlates and that stores the billing destination information received by the receiver and the billing amount information generated by the billing amount information generator; and
a printing unit that prints the billing destination information and the billing amount information stored in the billing information storage on a printing medium,
wherein the process content information stored in the process content information storage is information on at least one of a process of reading the document data, a process of displaying the document based on the document data, a process of searching for the document data, a process of writing data to the document data, a process of transmitting the document data to an external device, a process of storing the document data, and a process of printing the document data in the task terminal,
wherein the process content information on the process of printing the document data includes device identification information assigned to the printer or a device type information indicating a type of the printer, and
wherein the image display device further comprises:
a storage storing the device identification information or the device type information assigned to the printer; and
an identification information storage correlating and storing identification information indicating that the printer performs the printing operation with the billing amount information generated by the billing amount information generator, when the device identification information or the device type information included in the process content information is the device identification information or the device type information stored in the storage.

* * * * *